United States Patent [19]

Farmont

[11] Patent Number: 4,872,722
[45] Date of Patent: Oct. 10, 1989

[54] SUN ROOF FOR VEHICLES HAVING PROTECTIVE SCREENS

[75] Inventor: Rolf Farmont, Dusseldorf, Fed. Rep. of Germany

[73] Assignee: Farmont Produktion GmbH & Co. KG., Dusseldorf, Fed. Rep. of Germany

[21] Appl. No.: 239,611

[22] Filed: Sep. 1, 1988

Related U.S. Application Data

[63] Continuation of Ser. No. 13,352, Feb. 11, 1987, abandoned, which is a continuation-in-part of Ser. No. 733,138, May 10, 1985, abandoned.

[30] Foreign Application Priority Data

May 15, 1984 [DE] Fed. Rep. of Germany ....... 3417983

[51] Int. Cl.$^4$ .............................................. B60J 7/08
[52] U.S. Cl. ................................. 296/214; 296/216; 296/218; 160/120
[58] Field of Search ............... 296/211, 214, 216, 218, 296/215; 160/26, 31, 98, 120, 122, 268 R, 268

[56] References Cited

U.S. PATENT DOCUMENTS

| | | | |
|---|---|---|---|
| 2,126,328 | 8/1938 | Higby | 160/268 R |
| 3,075,805 | 1/1963 | Golde et al. | 296/98 |
| 4,161,336 | 7/1979 | LeVan et al. | 296/218 |
| 4,466,656 | 8/1984 | Igel | 296/216 |

FOREIGN PATENT DOCUMENTS

| | | | |
|---|---|---|---|
| 0076218 | 4/1983 | European Pat. Off. | 296/218 |
| 1430922 | 12/1968 | Fed. Rep. of Germany . | |
| 1530636 | 3/1970 | Fed. Rep. of Germany . | |
| 2313840 | 9/1973 | Fed. Rep. of Germany . | |
| 2636749 | 2/1978 | Fed. Rep. of Germany . | |
| 1102581 | 3/1981 | Fed. Rep. of Germany . | |
| 3000280 | 7/1981 | Fed. Rep. of Germany | 296/214 |
| 3242097 | 5/1983 | Fed. Rep. of Germany . | |
| 3241652 | 5/1984 | Fed. Rep. of Germany | 296/218 |
| 1511431 | 1/1968 | France . | |
| 0004627 | 1/1983 | Japan | 296/215 |

Primary Examiner—Dennis H. Pedder
Attorney, Agent, or Firm—Tarolli, Sundheim & Covell

[57] ABSTRACT

A sun roof for a vehicle having an opening in the roof thereof comprises a single outer cover and inner roller covers. The roller covers includes two sun protective screens which can be rolled up and unrolled and which extend beneath the outer cover within the opening on opposite sides of a middle line of the vehicle roof extending in the travel direction. The roller devices operate independently of each other.

4 Claims, 5 Drawing Sheets

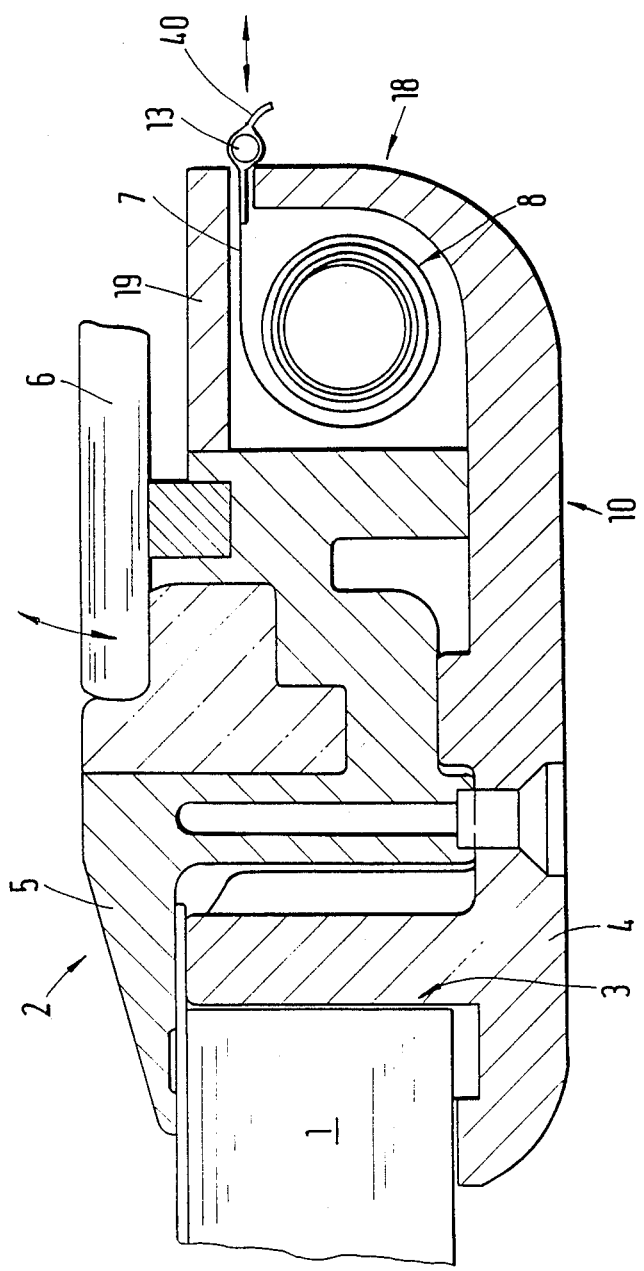

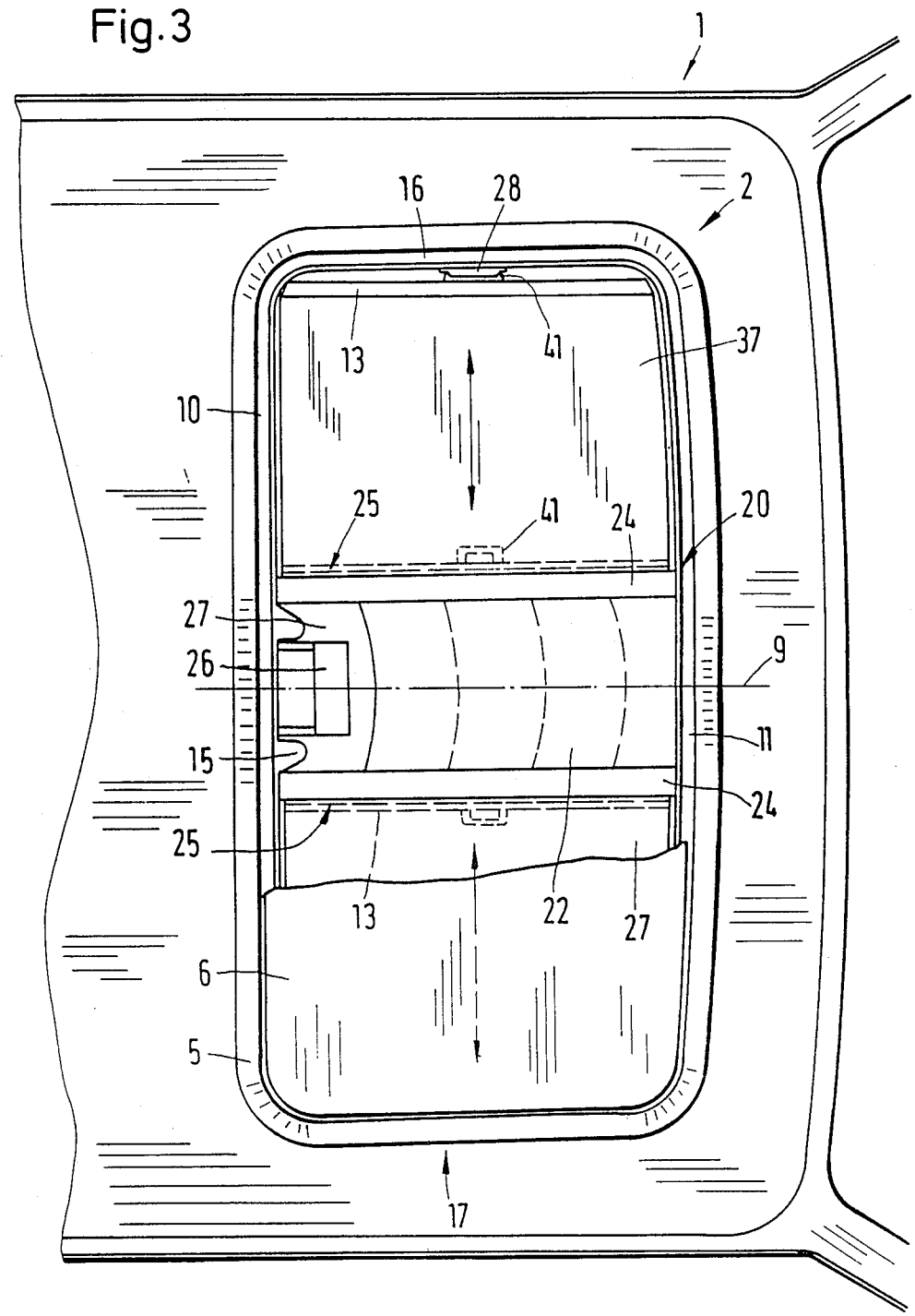

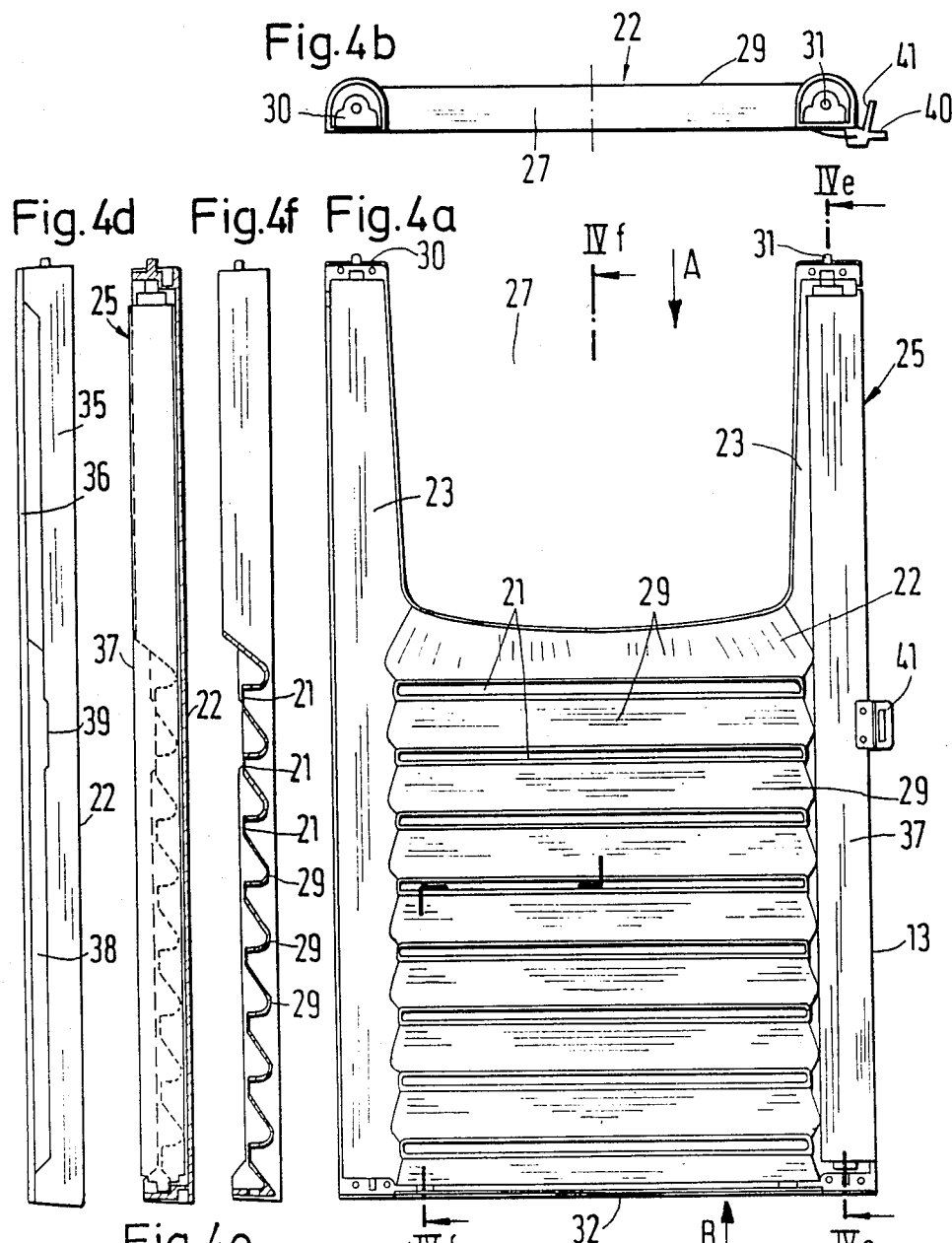
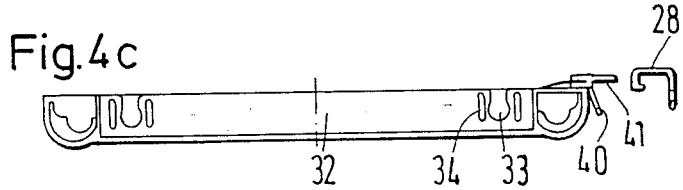

SUN ROOF FOR VEHICLES HAVING PROTECTIVE SCREENS

This is a continuation of application Ser. No. 013,352, filed on Feb. 11, 1987, abandoned, which is a continuation-in-part of application Ser. No. 733,138, filed May 10, 1985, abandoned.

BACKGROUND OF THE INVENTION

The invention relates to a sun roof for vehicles having a roof opening which sun roof comprises a cover for the opening and a rolled up sun protective screen adapted to extend beneath the cover.

The covers of such sun roofs can be lifted up or pushed along. The covers consist of a transparent material which lets through both the light and sun radiation. For protection against such radiation, sun protective screens mounted on a side of the cover or frame are used (German Disclosure Nos. 3,000,280 and 3,242,097). Such screens comprise a rigid frame having approximately tne size of the roof opening, and the screens may have slits which can be opened and closed with adjustable slit coverings to let more or less radiation and/or air pass through the slits. The known sun roofs have the disadvantage of being obstructive and passing not enough light, so that the feeling, usually given by sun roofs, of increased head room and pleasant light and air conditions, is impaired. Also, with the known sun protective screens, in the case of slit coverings which can be pushed along, less than 50% of the roof openings is free for unhindered passage of radiation. Snapped up slip coverings, which may be used as an alternative and which have a greater cross section area, are very complex and can hardly be kept free from snapping noises.

It is also known (German Disclosure 2,313,840) to roll up and unroll sun protective screens for vehicle roofs, or use rolling protection nets for sliding roofs (German Disclosure 2,636,749). The disadvantage of these types of devices consists in that the former requires complicated roof frames for mounting outside on the vehicle, and the latter are only effective when the slide roof is opened. Such roller devices are completely unsuitable, however, for sun roofs of the kind mentioned.

German Published Application 1,102,581 discloses a sun roof in which two winding shafts disposed at an angle to each other and joined in the middle with a hinge, are provided for the roller. In this known roller device, the rolled material must have an excessive length since otherwise the roller device would not function. Therefore, the rolled material hangs through badly in the middle. If there is no excess material, or, correspondingly, elastic rolled material is used, the winding shaft of the roller device cannot turn because of the geometric conditions, since the total length in the underside is necessarily less than on the upper side. The function of this known roller device is, therefore, jeopardized, since with horizontal pull of the rolled material, a moment of rotation in the pulling direction acts on the middle part of the winding shaft which is bent upward. It can hardly be imagined that generally simple end bearings of the winding shaft will be able to withstand the torsion applied to them. Rather, it may be assumed that the curve, formed by the winding shafts will be tilted in the horizontal direction by the pull on the roller material, and the roller material will hang through even more. It is doubtful that this known roller device is actually suitable for use on curved vehicle roofs. In any case, there is to be feared a hanging through of the rolled material that reduces head room in the vehicle space.

Moreover, the bending of the winding shaft makes it necessary, for the guiding of the rolled material in a curve corresponding to the arching of the vehicle roof, to arrange a rail below the roof frame, designed as a guide slot. This undesirably limits head room as compared with the head room given by the sun roof and its frame.

German Disclosure No. 1,530,636 discloses a roller device for vehicle sun roofs which can be equipped with a rigid base part. Placing this one-piece roller on arched vehicle roofs is possible only with considerable loss of head room.

German Disclosure No. 1,430,922 discloses a sun roof, in which the closing element has no rigid cover, can rather be rolled up, guided on its side edges extending in the pulling direction. This sun roof has no rigid cover of its own. The rolled material which can be rolled up can fulfill its function as closing element (sealing, of course), only if the vehicle roof is concave, thus, opposite the usual convex arching. Only in this way is it possible that, with an arrangement of the winding shaft within the raised roof frame, the closing element, which can be rolled up, will lie tightly against the opening edge of the roof opening.

Finally, French Pat. No. 1,511,431 discloses a sun roof that has the same disadvantages as the sun roof of German Disclosure No. 1,530,636.

The object of the invention is a sun roof of the kind mentioned that has a roller device which can be integrated into the vehicle body, especially into its roof opening so that it does not reduce the head room for the passengers, which roller device has little obstructive mass, is suitable for curved vehicle roofs, can be used with a cover which is opened, closed or removed, and especially with a cover which can be lifted up at its rear edge, and the necessary parts of which do not impair the aesthetic appearance of the sun roof, and which provides wide variations in the sun protection effect, especially for the driver and the front seat passenger. Such a roller device should be such that it can be mounted later. The sun protective screen should be able to cover between about 0 and 100% of the roof opening area. The roller device also should be such that it is possible to use it in connection with a frame, especially a plastic frame, supported in a manner known per se at the opening edge of the vehicle roof.

SUMMARY OF THE INVENTION

The object of the invention is achieved by providing on both sides of the middle line of the sun roof, in the travel direction, a roller device which can be operated independently from the other device, includes a sun protective screen extending (by their winding axis) in the travel direction, and is arranged together with the sun protective screen within the roof opening. A single cover covers the opening and the roller devices.

Alternatively, the roller devices may be mounted on opposite side portions of the sun roof frame with the sun protective screens extending (by their winding) transverse to the travel direction. The sun protective screens may have a fastening eyelet at free ends thereof for attaching the screens to a support extending along the middle line of the sun roof in the travel direction between front and rear portions of the sun roof frame. The fastening eyelets may be provided on opposite side surfaces of the sun protective screens close to the free ends of the screen for attaching the screens to the front and rear portions in case no support is provided between the front and rear portions of the sun roof frame.

The sun roof design according to the invention (and having sun protective screens) is especially suitable for mounting on existing vehicles.

In another embodiment of the sun roof according to the present invention, roller devices may be arranged on both sides of the axis of the sun roof in the travel direction, with their winding up axes extending crosswise of the vehicle. The two roller devices are, with their two sun protective screens, located within the roof opening, and are fastened to the front or rear support of the frame, while the free lengthwise ends of the screens extending to the roller devices are adapted to be connected to the opposite side frame supports.

Such an arrangement, designed according to the invention, is especially suitable for an inconspicuous integration of the roller device into the supports of a special frame supported by the edges of the vehicle body opening. Such frames are used especially in equipping vehicles with sun roofs.

Using sun roofs according to the invention results in that the head room of the vehicle passengers is not impaired by sun protective screens. The sun protective screens can be made from an elastic and very yielding layer material, which reduces the danger of head injuries, and without the sun protective screens forming rough folds. The roller device according to the invention, together with their sun protective screens, even in the rolled-up state has very little obstructive size and can be elegantly integrated into the sun roof, so that the aesthetic appearance is not impaired. Such roller devices can be comparatively easy installed on existing sun roofs. The use, according to the invention, of two independent roller devices arranged on each side of the middle line of the sun roof in the travel direction is especially advantageous when the actuating device for the cover projects into the roof opening, which is especially the case in so-called hinged roofs. In some of these sun roofs, manual opening and closing of the cover require extending the hand into or through the roof opening. Even in such sun roofs, the use of the roller device according to the invention is possible without problems.

Generally speaking, the invention consists, therefore, in arranging of two roller devices, operable independently of each other, below a single cover and within the frame of the sun roof.

The roller devices can be operable by the driver and front seat passenger separately from forward to backward, from right to left, or in each case conversely. Both devices can cover or leave free approximately the whole area of the roof opening, or, in the extended condition, form air gaps between them and/or at the edges at the side of the frame.

In the first embodiment of the sun roof of the invention, the two roller devices are mounted such that the sun protective screens extend in the travel direction. To this end, the ends of the roller devices can be fastened to front or rear supports of the sun roof frame or, according to another embodiment of the invention, the roller devices may be fastened to opposite side supports of the frame. In yet another embodiment of the invention, the roller devices are arranged on both sides of a roller support, which is then connected to the opposite front and rear supports of the frame. The roller support and the roller device may form a one-piece unit.

In view of the fact that the roof opening, in each case, is only half covered by one sun protective screen, the roller device with the sun protective screen rolled up, can have an extremely small diameter, which in most cases is not greater than the thickness of the roof frame below the cover.

Moreover, if necessary, only one half of the roof opening can be covered or freed. The arching of the vehicle roof which usually exists and which the sun roof must follow, is fully covered, in a first approximation by the sun protective screens according to the invention. Therefore, the roller devices do not project into the passenger space.

If an actuation device for opening and closing of the cover is arranged approximately in the zone of the middle line of the sun roof, near or at the front or rear support of the frame, and a free operating space for reaching into the roof opening is required, it is recommended, according to a further development of the invention, that the roller devices be arranged at the sides of the actuation device. This results in a free space between the sun protective screens extending in the travel direction. This free space can advantageously be filled with a roof support extending in the travel direction in the zone of the middle line between the opposite supports of the frame, which roof support may be designed, in particular, as a reinforcing element for the vehicle roof and may be used for the fastening of roller devices extending in the travel direction. In the later case, the roller device and the roof support may be advantageously made as a single installation unit which, since it is arranged between the driver and the front seat passenger, does not obstruct the head room, even when its construction height exceeds the thickness of the frame. An opening in the roof support for the operation of the actuation device for opening and closing of the cover permits to use the sun protective screens according to the invention with different sun roofs that are opened and closed by different actuation devices in the zone of the middle line. Additionally, or as an alternative, connection supports for the two roller devices may have ventilation slits that improve air conditioning of the vehicle.

According to another feature of the invention, the roller devices or the roller support may be joined detachably to the frame, by means of catch elements, so that in case of nonuse, or use of the roof opening for transportation purposes, the whole cross-section of the roof opening can be used. Otherwise, the roller support and/or the roller devices or a cover, advantageously provided to cover them, may be screwed to the roof frame or designed as an integral component of the supports of the frame.

The above-mentioned construction parts to be used according to the invention are not subject, in their size, shape, choice of material and technical concept, to any exceptional conditions, so that they may be used without limit within the known criteria of choice in the particular field of use.

BRIEF DESCRIPTION OF THE DRAWINGS

Further details, features and advantages of the present invention will appear from the description which follows with reference to respective drawings in which preferred forms of the execution of a sun roof according to the invention is shown. In the drawings:

FIG. 1a shows the top view of another embodiment of the sun roof;

FIG. 2 shows the section of the sun roof along the line II—II in FIG. 1;

FIG. 2a shows the section of the sun roof along line 2a—2a in FIG. 1a;

FIG. 3 shows a top view of another embodiment of the sun roof of FIG. 1;

FIG. 4a shows a top view of a roller support for the sun roof of FIG. 3;

FIG. 4b shows the roller support of FIG. 4a as seen in View A;

FIG. 4c shows the roller support of FIG. 4a, as seen in View B turned 180°;

FIG. 4d shows the roller support of FIG. 4a as seen in View C;

FIG. 4e shows a section of the roller support of FIG. 4a, along the line IVe—IVe;

FIG. 4f shows a section of the roller support of FIG. 4a along line IVf—IVf.

In the roof of a vehicle body 1, there is provided a roof opening closed by a sun roof 2. The sun roof 2 comprises frames 4, 5, supported on the edge 3 of the opening in the roof of the vehicle body 1 (FIG. 2), and a single transparent cover 6, which can be lifted or pushed along. A sun protective screen is located below the cover 6. The protective screen 7 can be rolled on and unrolled from a commonly known roller device 8. As shown in FIG. 1, two roller devices 8, one on each side of a middle line 9 are attached to a rear frame support 10 in the travel direction of the sun roof 2. On the opposite front frame support 11, there are provided fastening points 12 for free lengthwise edges 13 of the screens 7 which extend parallel to the roller devices 8. The free edges 13 are provided with fastening eyelets 13a for fastening to fastening points 12.

Figure 1:
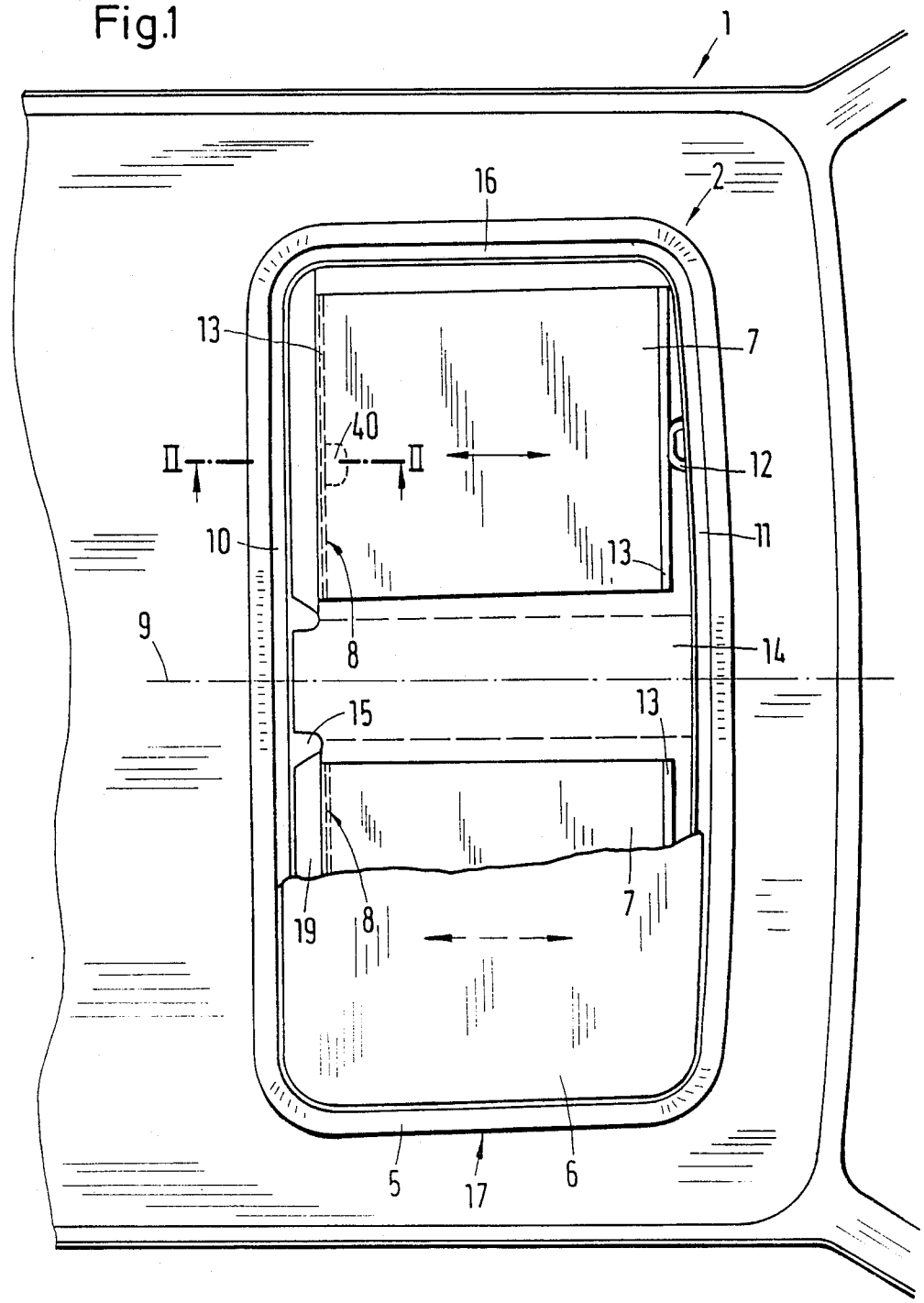
FIG. 1 shows a top view of a sun roof with a section of a vehicle body.

The zone 14, shown in broken line, on both sides of the middle line 9, may include roof support, not shown. The left end of the zone 14, taken in the traveling direction in the area of a socket 15 for receiving an actuation device (not shown) for opening and closing of the cover 6, is connected with the rear support 10 of the frame. The roller devices occupy the space between the socket 15 and the side supports 16 and 17 of the frame.

In the rolled-up condition, the sun protective screen 7 is in the position shown in broken line in the left portion of FIG. 1, and opens the cross section of the opening of the sun roof almost completely.

As shown in FIG. 2, the roller devices 8 are attached to the rear frame support 10, and the frames 4 and 5 form three sides of a sun roof housing 18. A cover 19 closes the fourth side of the housing 18, leaving free a guide slot for the sun protective screen 7. The sun protective screen 7 has, at the front lengthwise edge 13 thereof a reinforcing element, known per se, and a handle element, as well as any corresponding fastening means which may be necessary for keeping the screen in the unrolled condition. The roller device 8 has a pullback mechanism, known per se, and is fastened either to the housing 18 or directly to the frame support 10. The housing 18 with roller device may also be installed later on the frame support 10 as a (single) construction element (not shown). The roller device and the sun protective screen are, therefore, arranged within the roof opening, in the unrolled and rolled up conditions of the sun protective screen; that is, in the zone of a hollow space determined by the thickness of the frame and limited by the frame supports.

The sun roof of FIG. 1a has the same structure as that of FIG. 1, the only difference being that the roller devices 8 are mounted on opposite side supports 16 and 17, and the sun protective screens are rolled and unrolled transverse to the travel direction. The fastening eyelets 13a may be attached as to the free lengthwise edge of sun protective screens 7 so to the opposite side edges of sun protective screens 7. In the first case, the fastening eyelets 13a are connected with fastening points 12a provided on a support 14a. In the second case, the fastening eyelets 13a are connected to fastening points on the front and rear supports 10 and 11.

FIG. 3 shows another embodiment of the sun roof according to the invention. A roller support 20 may form one piece with the frame 4, or may be mounted as a compact installation element between the front and rear frame supports 11, 10 preferably by means of a detachable catch connection with a respective frame support. The roller support 20 may consist of a bottom part 22 and a cover part 24, at least partly covering the latter. The roller devices are arranged on both sides of an actuation device 26, known per se, for the opening and closing of the cover. The roller support 20 has, in the zone of the actuation device 26, an opening 27 for the unhindered operation of the same. The middle zone of the roller support 20 may also have, as illustrated in broken lines, ventilation, light slits, 21 etc. The sun protective screens are unrolled toward the frame supports 16, 17 and are fastened there, to fastening elements 28 (such as hooks) within the roof opening, for example, by means of eyelets (see FIGS. 4a to 4c).

According to a preferred form of execution of the roller support 20, shown in FIGS. 4a to 4f, its main element may consist of the bottom part 22, made of plastic, which defines along its lengthwise sides roller housing portions 23, between which extend connecting supports 29 partially covering the area of the bottom part while in the remaining area, between the roller housing portions 23, an opening 27 is formed for the actuation device. The supports 29 extend at least along a half of the longitudinal extent of the roller housing portions 23. For detachable fastening to the frame of the sun roof, there may be provided at one end 30 bosses 31, engaging in bores (not shown) of the sun roof frame, while the opposite end surface 32 of the roller support 20, has catch slots 33 for engaging with corresponding frame-side catch means, while elongated holes 34 in the end surface 32, arranged at the side of the catch slots 33, provide a certain spring action, which is advantageous for more frequent opening and closing of the catch connection.

As shown from FIGS. 4d to 4f, the outer lengthwise walls 35 of the roller support 20 are slightly lowered outside in their flat end zones, so that in connection with the covers 36 (FIG. 4d) which can be screwed onto the roller housing zone, a guide slot 38 remains free for the sun protective screens 37, which can be rolled up automatically on the roller devices 25, shown only in the right half of FIGS. 4a to 4c and in FIG. 4e. Winding 39 of the guide slot 38 at the center of the slot makes it possible to partially lower the fastening eyelets 41 (FIGS. 1 to 3) of the sun protective screen.

Especially advantageous is a one-point fastening of the unrolled screen, by means of a hook-and-eye connection, as shown in FIG. 3 and in FIGS. 4a to 4c, in which the hook, fastened by a rivet, for example, or the eyelet, has at the middle of the lengthwise edge of the sun protective screen 37, a rigid actuating strap extending at an angle downward.

What I claim is:

1. A sun roof for a vehicle having an opening in the roof thereof, said sun roof comprising:

a single cover for the opening;

frame means for supporting said cover for the opening;

sun protective screen means at least partially enclosed by said frame means and located under said cover, said sun protective screen means comprising two sun protective screens, two independently operated roller devices for rolling and unrolling said two sun protective screens in direction transverse to the longitudinal extent of the vehicle, and support means for supporting said roller devices on said frame means and located under said cover; and actuation means for opening and closing said cover and supported by said frame means;

said support means comprising two housing portions for supporting said two roller devices, respectively, and a transverse support interconnecting said two housing portions, said two housing portions extending between front and rear edges of said frame means for the opening and along a middle line of the vehicle roof extending longitudinally of the vehicle and on opposite sides of the middle line, said two housing portions and transverse support defining a substantially U-shaped end portion at an end of said support means for partially enclosing said actuation means; and said support means comprising catch means for detachably mounting said support means in said frame means to enable removal of said sun protective screen means as a unit from said frame means.

2. A sun roof as set forth in claim 1 wherein free ends of said sun protective screens have fastening means thereon for engaging complimentary fastening means on said frame means upon unrolling of said sun protective screens.

3. A sun roof as set forth in claim 1 wherein said transverse support extends at least along a half of the longitudinal extent of said housing portions and defines ventilation and light slits therein.

4. A sun roof for a vehicle having an opening in the roof thereof, said sun roof comprising a single cover for the opening, frame means for supporting said cover for the opening, and sun protective screen means enclosed and supported by said frame means and located beneath said cover, said sun protective screen means comprising two sun protective screens and two independently operated roller devices for rolling and unrolling said two sun protective screens, said frame means comprising upper and lower frame members clamping therebetween an edge portion of the roof defining the opening, one of said upper and lower frame members supporting said roller devices, and one of said upper and lower members having a first portion for engaging an edge portion of the roof and extending from said edge portion inwardly relative to the opening to a location beyond said roller devices and a second portion projecting from said first portion at said location into the roof opening for partially enclosing said roller devices between upper and lower frame members.

* * * * *